United States Patent
Chang (12) United States Patent (10) Patent No.: US 7,253,559 B2
(45) Date of Patent: Aug. 7, 2007

(54) PLASMA DISPLAY PANEL HAVING DIELECTRIC LAYER WITH SPECIFIC COLOR ADDICTIVE

(75) Inventor: Myeong Soo Chang, Uiwang (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 10/242,757

(22) Filed: Sep. 13, 2002

(65) Prior Publication Data
US 2003/0102803 A1 Jun. 5, 2003

(30) Foreign Application Priority Data
Dec. 3, 2001 (KR) ............................... 2001-75965

(51) Int. Cl.
*H01J 17/49* (2006.01)

(52) U.S. Cl. ..................... 313/586; 313/587; 313/110; 501/71; 501/78

(58) Field of Classification Search .............. 313/484, 313/485, 489, 491, 495, 514, 518, 110, 112, 313/567, 635, 283, 291, 292, 582–587, 568; 501/71, 78
See application file for complete search history.

(56) References Cited

U.S. PATENT DOCUMENTS

| | | | | |
|---|---|---|---|---|
| 4,060,749 A | * | 11/1977 | Shinada et al. | ............ 313/484 |
| 4,320,418 A | * | 3/1982 | Pavliscak | .................... 348/797 |
| 4,521,524 A | * | 6/1985 | Yamashita | ................... 313/480 |
| 5,108,960 A | * | 4/1992 | Boek et al. | ................. 313/480 |
| 5,182,489 A | * | 1/1993 | Sano | .......................... 313/485 |
| 5,433,941 A | * | 7/1995 | Patel | .......................... 424/50 |
| 5,838,106 A | | 11/1998 | Funada | ...................... 313/587 |
| 6,242,859 B1 | | 6/2001 | Betsui et al. | ............... 313/584 |
| 6,333,600 B1 | * | 12/2001 | Mizobata | .................... 313/587 |
| 6,344,080 B1 | | 2/2002 | Kim et al. | ............. 106/287.23 |
| 6,395,660 B1 | * | 5/2002 | Seto et al. | ..................... 501/71 |
| 2003/0102477 A1 | * | 6/2003 | Lee | ............................. 257/72 |
| 2004/0027071 A1 | * | 2/2004 | Fujimine et al. | ............ 313/582 |

FOREIGN PATENT DOCUMENTS

| JP | 09-274106 | | 10/1997 |
|---|---|---|---|
| JP | 09-274107 | | 10/1997 |
| JP | 2000-226229 | | 8/2000 |
| JP | 2000-228152 | * | 8/2000 |
| JP | 2000226229 A | * | 8/2000 |
| JP | 2000-353474 | | 12/2000 |

OTHER PUBLICATIONS

JP Office Action dated Feb. 22, 2005.

* cited by examiner

Primary Examiner—Karabi Guharay
(74) Attorney, Agent, or Firm—Ked & Associates, LLP

(57) ABSTRACT

A plasma display panel is able to contrast thereof by increasing a color temperature of the plasma display panel, which comprises a dielectric layer controlling a light transmittance for visible light of a certain wavelength emitted from a phosphor in the plasma display panel.

8 Claims, 4 Drawing Sheets

| COMPOSITION OF DIELECTRIC LAYER | 1 | 2 | 3 | 4 | 5 | 6 |
|---|---|---|---|---|---|---|
| PbO | 67 | 67 | 60 | 55 | 72 | 66 |
| $SiO_2$ | 21 | 21 | 1 | 5 | 10.7 | 3.5 |
| $B_2O_3$ | 4.2 | 4.2 | 20 | 15 | 17 | 13 |
| $Al_2O_3$ | 7 | 7 | 1 | 2 | – | 3 |
| MgO | 0.5 | 0.5 | – | – | – | – |
| CaO | – | – | – | – | – | 0.5 |
| ZnO | – | – | – | – | – | 9 |
| CoO | 3 | – | – | – | 3 | – |
| $Nd_2O_3$ | – | – | 18 | 23 | – | 5 |
| $Co_3O_4$ | | 3 | – | – | – | – |
| THERMAL EXPANSION COEFFICIENT $(\times 10^{-7}/°C)$ | 75 | 70 | 85 | 80 | 84 | 84 |
| TRANSITION POINT (°C) | 462 | 458 | 469 | 472 | 408 | 380 |

PLASMA DISPLAY PANEL HAVING DIELECTRIC LAYER WITH SPECIFIC COLOR ADDICTIVE

BACKGROUND OF THE INVENTION

1. Field of the Invention

The present invention relates to a plasma display panel, and particularly, to a plasma display panel which is able to improve color temperature thereof.

2. Description of the Background Art

Generally, a plasma display panel is a display device exciting a fluorescent layer using ultraviolet rays of plasma and displaying an image using visible lights generated from the fluorescent layer.

Important properties the plasma display panel should have are high color temperature more than 9300° K and high contrast ratio. Herein, the contrast means a ratio of brightness on the brightest part and on the darkest part of a screen. The contrast is lowered by near infrared ray or visible light generated from discharge gas inside the plasma display panel or by outer visible light irradiated and reflected from outer side. Therefore, various methods are used for improving the color temperature and the contrast conventionally. Hereinafter, a structure of the conventional plasma display panel will be described with reference to FIG. 1.

Figure 1:
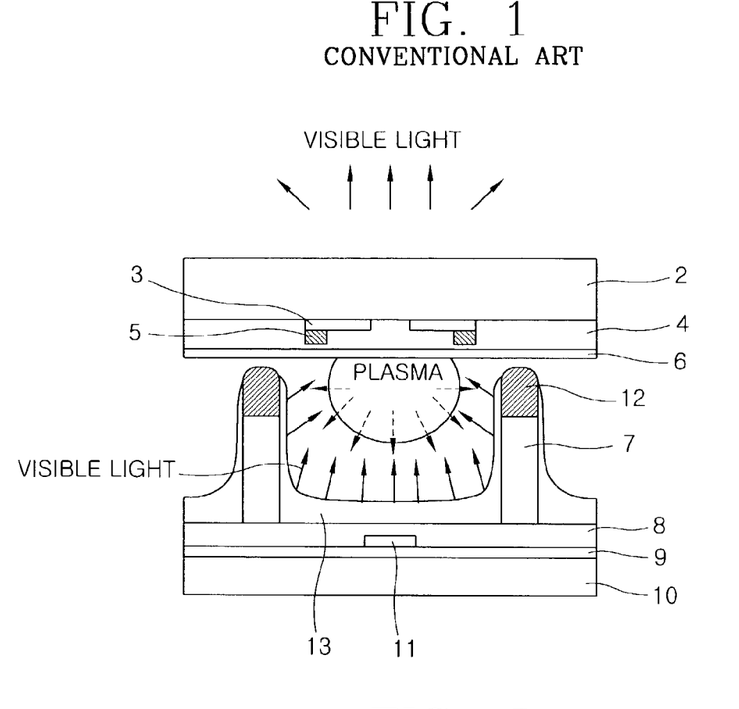
FIG. 1 is a cross-sectional view showing a structure of a plasma display panel according to the conventional art.

FIG. 1 is a cross-sectional view showing a structure of plasma display panel according to the conventional art.

As shown therein, the conventional plasma display panel comprises: a lower insulating layer 9 formed on a lower glass substrate 10; an address electrode 11 formed on a predetermined part of the lower insulating layer 9; a lower dielectric layer 8 formed on the address electrode 11 and on the lower insulating layer 9; a barrier rib 7 defined on a predetermined part on the lower dielectric layer 8 for dividing each discharge cell; a black matrix layer 12 formed on the barrier rib 7; a fluorescent layer 13 formed to have a predetermined thickness on side surfaces of the black matrix layer 12 and of the barrier rib 7 and on the lower dielectric layer 8 for emitting visible lights of red, green, and blue colors by being supplied the ultraviolet ray; an upper glass substrate 2; a sustain electrode 3 formed on a predetermined part of the upper glass substrate 2 so as to cross the address electrode 11 vertically; a bus electrode 5 formed on a predetermined part of the sustain electrode 3; an upper dielectric layer 4 formed on the bus electrode 5, the sustain electrode, and on the upper glass substrate 2; a passivation layer formed on the upper dielectric layer 4 for protecting the upper dielectric layer 4. Hereinafter, operations of the conventional plasma display panel will be described.

As the upper glass substrate 2 and as the lower glass substrate 10 of the conventional plasma display panel, a soda-lime silicate (SLS) glass substrate is used. The lower insulating layer 9 is located on the lower glass substrate 10, that is, the SLS glass substrate, and the address electrode 11 is located on a predetermined part on the lower insulating layer 9.

The lower dielectric layer 8 located on the address electrode 11 and on the lower insulating layer 9 blocks the visible light emitted toward the lower glass substrate 10 direction. Also, a dielectric layer having high reflectance is used as the lower dielectric layer 8 in order to increase a luminous efficiency.

The fluorescent layer 13 consists of red, green, blue color phosphors, and emits visible light having a certain wavelength according to intensity of ultraviolet ray by the plasma which is generated on an area between the barrier ribs 7.

On the other hand, the sustain electrode 3 which crosses with the address electrode 11 is located on lower part of the upper glass substrate 2, that is, the SLS glass substrate, the bus electrode 5 is located on a predetermined part of the sustain electrode 3, and the dielectric layer 4 having superior light transmittance is located on the bus electrode 5. Also, the passivation layer 6 is located on the dielectric layer 4 in order to prevent the dielectric layer from being damaged by the plasma.

After that, when voltage is applied to the sustain electrode 3, a voltage difference is generated between the bus electrode 5 and the address electrode 11 which crosses with the bus electrode 5 in vertical direction. The gas located in an area between the barrier ribs 7 becomes plasma status due to the voltage difference, and therefore, the visible light of a certain wavelength is emitted from the fluorescent layer 13 by the ultraviolet ray generated from the plasma. For example, in the plasma display panel, the discharge gas in a pixel area defined by the barrier rib 7 becomes plasma status by a potential difference between the address electrode 11 and the bus electrode 5. At that time, the fluorescent layer 13 is excited by the ultraviolet ray of the plasma to emit the visible light, and the plasma display panel displays an image using the visible light. That is, the plasma display panel excites the fluorescent layer 13 using the ultraviolet ray generated by Xe gas among the discharge gases such as He gas, Xe gas, and Ne gas which are injected into a discharge space divided by the barrier rib 7, and displays desired color. At that time, it is required that the plasma display panel should have high contrast. That is, the displaying property (that is, the contrast) is improved as the difference between the highest brightness and the lowest brightness becomes larger.

Therefore, in order to improve the contrast of the plasma display panel, a material having superior light transmittance should be used. In order to improve the light transmittance, MgO is used as a material of the passivation layer 6, dielectrics of $PbO$—$B_2O_3$—$SiO_2$ group is used as a material of the upper dielectric layer 4 and of the lower dielectric layer 8.

On the other hand, one of important features the plasma display panel should have is high color temperature. For example, when a signal of white color having no color signal is inputted (that is, R, G, and B signals are all inputted) into a display device such as a monitor and a television, the displayed white color is important for color designing in the display. Generally, the monitor uses color temperature of 9500° K, and the television uses the color temperature of 12000~13500° K.

Generally, the television displays the white color as a light blue color group to make viewers recognize the white color more clearly, and a projection television uses white color of 6500~7000° K by the property of a lamp used as a light source and by the efficiency of the system. That is, the color temperature is controlled by controlling white balance, and the color temperature is determined by a luminance and a chromaticity of base color. That is, ratio of R, G, B and color coordinate are determined by the luminance and the chromaticity of the base color, and accordingly, the color temperature is also determined.

The fluorescent layer 13 in the conventional plasma display panel emits visible lights of green, red, and blue colors by vacuum ultraviolet rays having 147 nm wavelength. At that time, an emission intensity of green color is the largest among those visible lights, the emission intensity of the red color is the next, and the emission intensity of the blue color which affects to the color temperature most is the lowest. Therefore, since the emission intensity of the blue color is low in the conventional plasma display panel, the light properties (color temperature) can not help being lowered unless the material of phosphor (fluorescent layer) is improved.

In order to increase the color temperature, the conventional plasma display panel forms the barrier ribs 7 as an asymmetric structure to enlarge emission area of the blue phosphor more than those of the green and red phosphors, and thereby the emission intensity of the blue color visible light is increased relatively more than those of the green and red color visible lights. However, although the above method is able to improve the color temperature and the contrast, item difficulty in fabricating processes is increased and an yield is also lowered.

Also, in another conventional plasma display panel for improving the color temperature, an electric signal which is inputted into a certain pixel is reduced in order to emit the blue color visible light than any other visible lights. However, in this case, the luminance and the contrast are lowered.

On the other hand, other conventional plasma display panel and fabrication method thereof is described in detail in U.S. Pat. No. 5,838,106 registered on Nov. 17, 1998, U.S. Pat. No. 6,242,859 registered on Jun. 5, 2001.

As described above, the conventional plasma display panel forms the barrier ribs asymmetrically to enlarge the emission area of the blue color phosphor in order to improve the color temperature by emitting the blue color visible light more than the red and green color visible lights. Thereby, the item difficulty is increased in the fabricating processes, and accordingly, the yield is decreased.

Also, the conventional plasma display panel reduces the electric signal which is inputted into a certain pixel in order to improve the color temperature by emitting the blue color visible light more than the red and green visible lights, and thereby the luminance and the contrast are reduced.

SUMMARY OF THE INVENTION

Therefore, an object of the present invention is to provide a plasma display panel which is able to improve a contrast thereof easily by increasing a color temperature of the plasma display panel.

To achieve the object of the present invention, as embodied and broadly described herein, there is provided a plasma display panel comprising a dielectric layer for controlling a light transmittance of a visible light of certain wavelength emitted from a phosphor in the plasma display panel.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, the preferred embodiment of a plasma display panel according to the present invention which is able to improve a contrast and a color temperature thereof using a dielectric layer controlling a light transmittance for visible light of certain wavelength which is emitted from a fluorescent layer in the plasma display panel will be described with reference to FIGS. 2 through 5.

Figure 2:
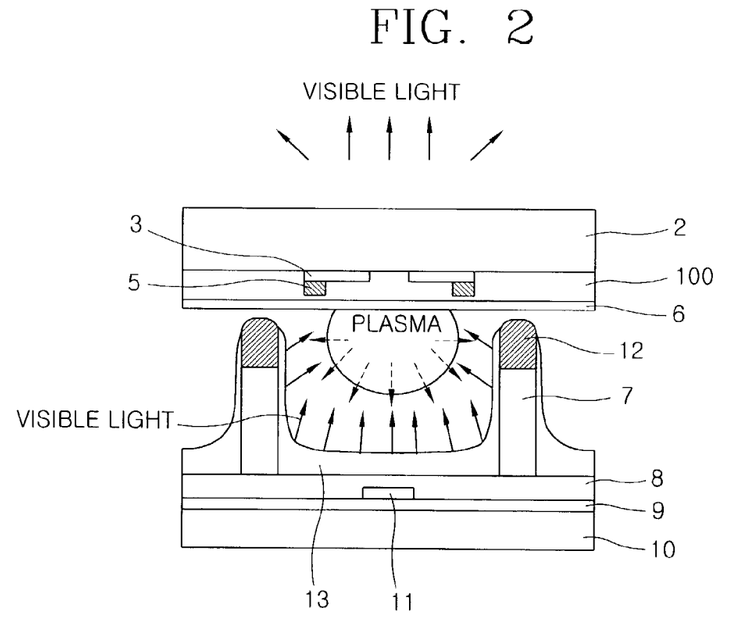
FIG. 2 is a cross-sectional view showing a structure of a plasma display panel according to the present invention.

FIG. 2 is a cross-sectional view showing a structure of the plasma display panel according to the present invention.

As shown therein, the plasma display panel comprises: a lower insulating layer 9 formed on a lower glass substrate 10; an address electrode 11 formed on a predetermined portion of the lower insulating layer 9; a lower dielectric layer 8 formed on the address electrode 11 and on the lower insulating layer 9; a barrier rib 7 defined on a predetermined portion on the lower dielectric layer 8 for dividing each discharging cell; a black matrix layer 12 formed on the barrier rib 7; a fluorescent layer 13 formed on side surfaces of the black matrix layer 12 and of the barrier rib 7 and on the lower dielectric layer 8 for emitting red, green, and blue color visible lights by being supplied ultraviolet ray; an upper glass substrate 2; a sustain electrode 3 formed on a predetermined portion of the upper glass substrate 2 so as to cross with the address electrode 11 vertically; a bus electrode 5 formed on a predetermined portion of the sustain electrode 3; an upper dielectric layer 100 formed on the bus electrode 5, on the sustain electrode 3, and on the upper glass substrate 2 for increasing a transmittance of blue color visible light among visible lights of blue, red, and green colors emitted from the fluorescent layer 13 more than those of the red and green color visible lights; and a passivation layer 6 formed on the upper dielectric layer for protecting the upper dielectric layer 6.

The upper dielectric layer 100 according to the present invention increases the light transmittance of the blue color visible light more than the red and green color visible lights to improve the color temperature and the contrast of the plasma display panel, and thereby, an image quality of the plasma display panel can be enhanced.

Hereinafter, structures except the upper dielectric layer 100 are same as those of the conventional art, and therefore, explanations for those will be emitted. Therefore, the preferred embodiment of the upper dielectric layer 100 which is formed on the bus electrode 5, on the sustain electrode 3, and on the upper glass substrate 2 for increasing the light transmittance of the blue color visible light more than the red and green color visible lights will be described in more detail.

The upper dielectric layer 100 of the plasma display panel according to the present invention includes composition which is able to change the transmittance for a visible light of a certain wavelength. That is, the upper dielectric layer of the general plasma display panel (reference numeral 4 in FIG. 1) consists of dielectrics of PbO—$B_2O_3$—$SiO_2$ group, and transmits visible lights of certain wavelengths (red, green, and blue color visible lights) as same transmittances. That is, the conventional upper dielectric layer (reference numeral 4 in FIG. 1) shows same transmittances for the red, green, and blue color visible lights, and therefore, the red, green, and blue color visible lights emitted from the fluorescent layer 13 are transmitted through the conventional upper dielectric layer (reference numeral 4 in FIG. 1) as they are. Therefore, difference of the color temperature is determined by the properties of the conventional fluorescent layer 13.

On the contrary, the upper dielectric layer 100 according to the present invention consists of dielectrics of PbO—$B_2O_3$—$SiO_2$ group, oxide of transition metal, and oxide of rare-earth element as mixing them, and the transmittances for the red, green, and blue color visible lights can be set to be different from each other. That is, the light transmittance of the blue color visible light which affects to the color temperature most is set to be higher than those of the red and green color visible lights, and therefore, quantity of blue color visible light represented on the front of the upper glass substrate 2 is relatively larger than those of the red and green color visible lights.

The upper dielectric layer 100 is able to filter the visible lights since the upper dielectric layer 100 is colored. That is, the quantity of the visible light of desired wavelength (blue color visible light) which is transmitted through the colored upper dielectric layer 100 is larger than those of the other visible lights (red and green color visible light). For example, the upper dielectric layer 100 is colored to be a certain color, and increases the visible light (blue color visible light) having the same wavelength as that of the colored color more than the light transmittances of the visible lights (red and green color visible lights) having different wavelengths.

Composition of the upper dielectric layer 100 which is able to transmit the quantity of the blue color visible light more than those of the red and green color visible lights comprises the dielectric of the PbO—$B_2O_3$—$SiO_2$ group, and one filler or more among $Nd_2O_3$, CoO, and $Co_3O_4$. For example, as in following Table 1, the composition of the upper dielectric layer 100 may consist of dielectric of 55 weight %~72 weight % PbO, 4.2 weight %~20 weight % $B_2O_3$, 1 weight %~21 weight % $SiO_2$ group; and a filler of 5 weight %~23 weight % $Nd_2O_3$, 0 weight %~3 weight % CoO, and 0 weight %~3 weight % $Co_3O_4$.

TABLE 1

Composition of the upper dielectric layer of
PbO—$B_2O_3$—$SiO_2$—$Nd_2O_3$—CoO—$Co_3O_4$ group

| Component | PbO | $B_2O_3$ | $SiO_2$ | $Nd_2O_3$ | CoO | $Co_3O_4$ |
|---|---|---|---|---|---|---|
| Weight % | 55-72 | 4.2-20 | 1-21 | 5-23 | 0-3 | 0-3 |

Composition rate of the upper dielectric layer is given assuming the weight of the upper dielectric layer to be 100 weight percent. Herein, if the $Nd_2O_3$ is added in the upper dielectric layer 100 to be less than 5 weight %, the light filtering effect is reduced, and if the $Nd_2O_3$ is added more than 23 weight %, a transition point is too high. Also, if the CoO and $Co_3O_4$ are added more than 3 weight % in the upper dielectric layer 100, the upper dielectric layer is colored excessively. That is, if the CoO and $Co_3O_4$ are added in the upper dielectric layer 100 more than 3 weight %, the light transmittance of the plasma display panel is declined greatly, the color of outer appearance becomes too deep, and the color is not balanced, and therefore, the upper dielectric layer 100 can not be used.

Figure 3:
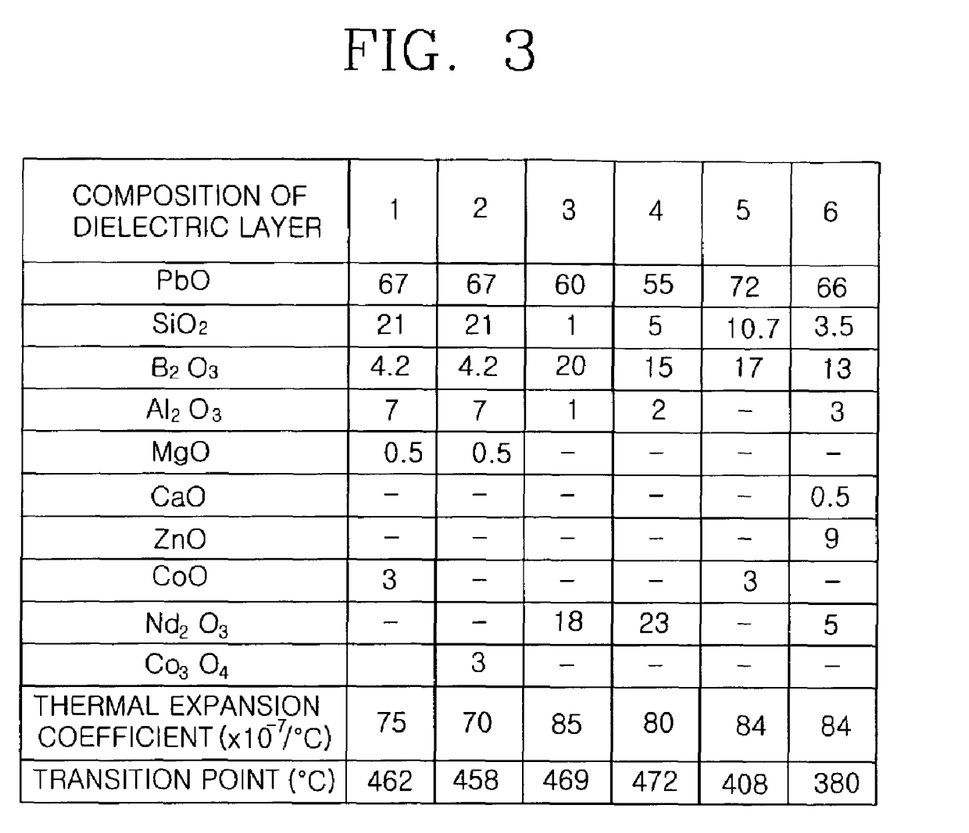
FIG. 3 is a table showing weight % of an upper dielectric layer of the plasma display panel according to another embodiment of the present invention.

FIG. 3 is a table showing composition of the upper dielectric layer 100 according to another embodiment of the plasma display panel. That is, FIG. 3 is showing compositions of the upper dielectric layers 100 according to 6 embodiments.

As shown therein, the upper dielectric layer 100 comprises 55 weight %~72 weight % PbO, 1 weight %~21 weight % $SiO_2$, 4.2 weight %~20 weight % $B_2O_3$, 1~7 weight % $Al_2O_3$, 0~0.5 weight % MgO, 0~0.5 weight % CaO, 0~9 weight % ZnO as mixing them. Also, the upper dielectric layer is formed by further being mixed with a filler consists of 0~3 weight % CoO, 0~3 weight % $Co_3O_4$, and 0~23 weight % $Nd_2O_3$.

In the table of FIG. 3, thermal expansion coefficients and transition points according to the respective embodiments of the upper dielectric layer 100 are shown. In addition, the thermal expansion coefficient of the upper dielectric layer 100 ranges $70 \times 10^{-7}/°$ C. through $85 \times 10^{-7}/°$ C., and the temperature of the transition point ranges 380° C. through 472° C.

On the other hand, the upper dielectric layer 100 may use fillers of NiO, MnO, $Mn_3O_4$, $Gd_2O_3$, $Cr_2O_3$, $V_2O_5$, and CuO besides the filler of $Nd_2O_3$—CoO—$Co_3O_4$ group. The NiO, MnO, $Mn_3O_4$, $Gd_2O_3$, $Cr_2O_3$, $V_2O_5$, and CuO are materials which are able to color the upper dielectric layer 100, and one or more materials among those NiO, MnO, $Mn_3O_4$, $Gd_2O_3$, $Cr_2O_3$, $V_2O_5$, and CuO can be mixed to use.

On the other hand, the upper dielectric layer 100 is formed by using a paste print method or a laminating method. The methods will be described in detail with reference to FIGS. 4 and 5.

Figure 4:
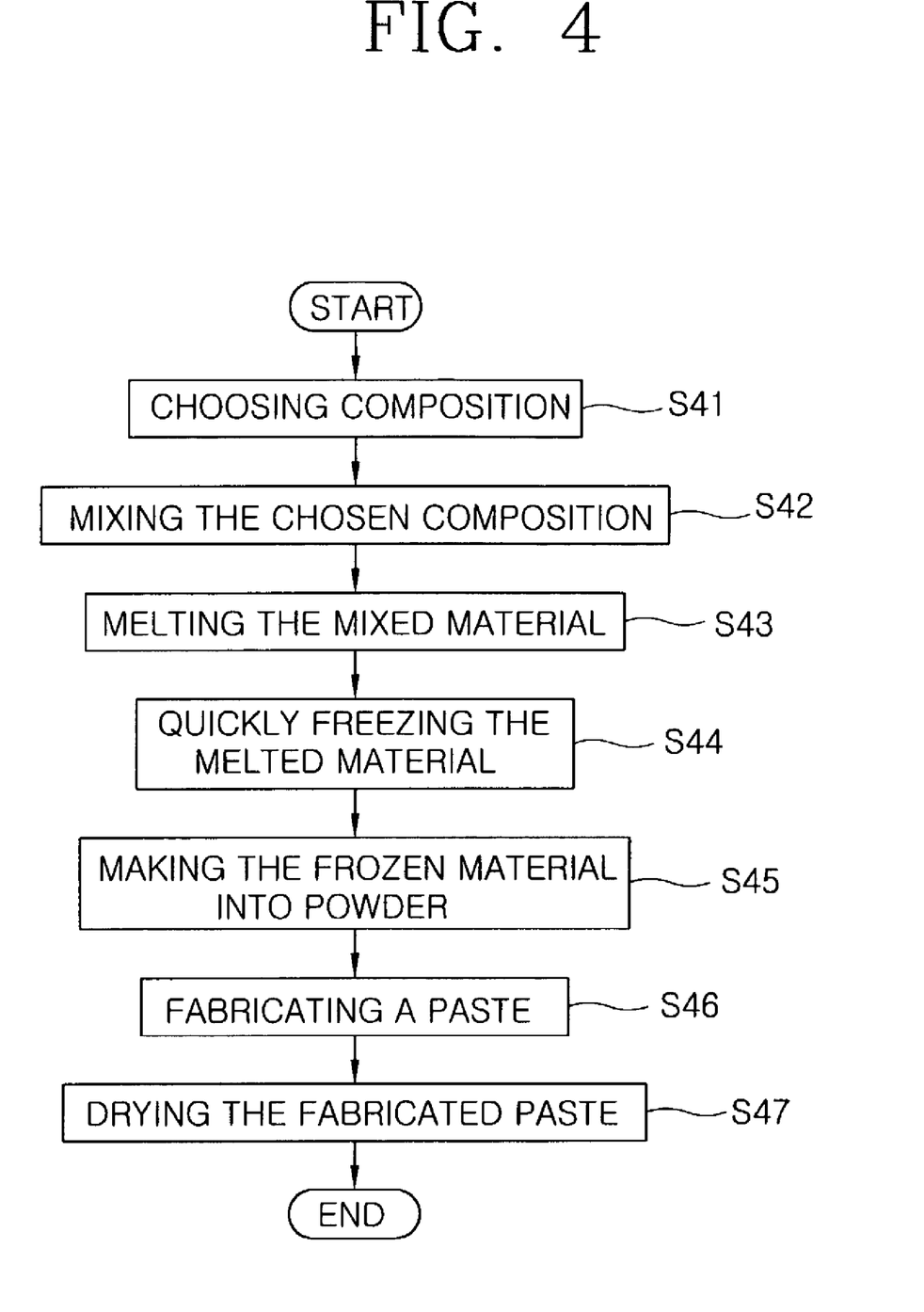
FIG. 4 is a flow chart showing fabricating processes of the upper dielectric layer using a paste printing method.

FIG. 4 is a flow chart showing a method for fabricating the upper dielectric layer 100 using the paste print method. Hereinafter, the method for fabricating the upper dielectric layer 100 will be described in more detail in order.

1. Materials for fabricating the upper dielectric layer 100 are chosen with reference to Table 1 or the table in FIG. 3. At that time, compositions are chosen according to the characteristic of the plasma display panel which will be fabricated (S41).

2. The chosen materials are mixed together (S42).

3. The mixed material is put into a platinum crucible, and melted by being heated with 1000~1400° C. temperature (S43).

4. The melted material is quickly frozen using a water quenching method or a quenching roller (S44).

5. The frozen material is ground to fine powder (S45).

6. The fine powder and an organic solvent are mixed to make a paste (S46).

7. The fabricated paste is applied on the glass substrate 2 and dried to form a filter (dielectric layer 100) for filtering the visible lights (S47).

Figure 5:
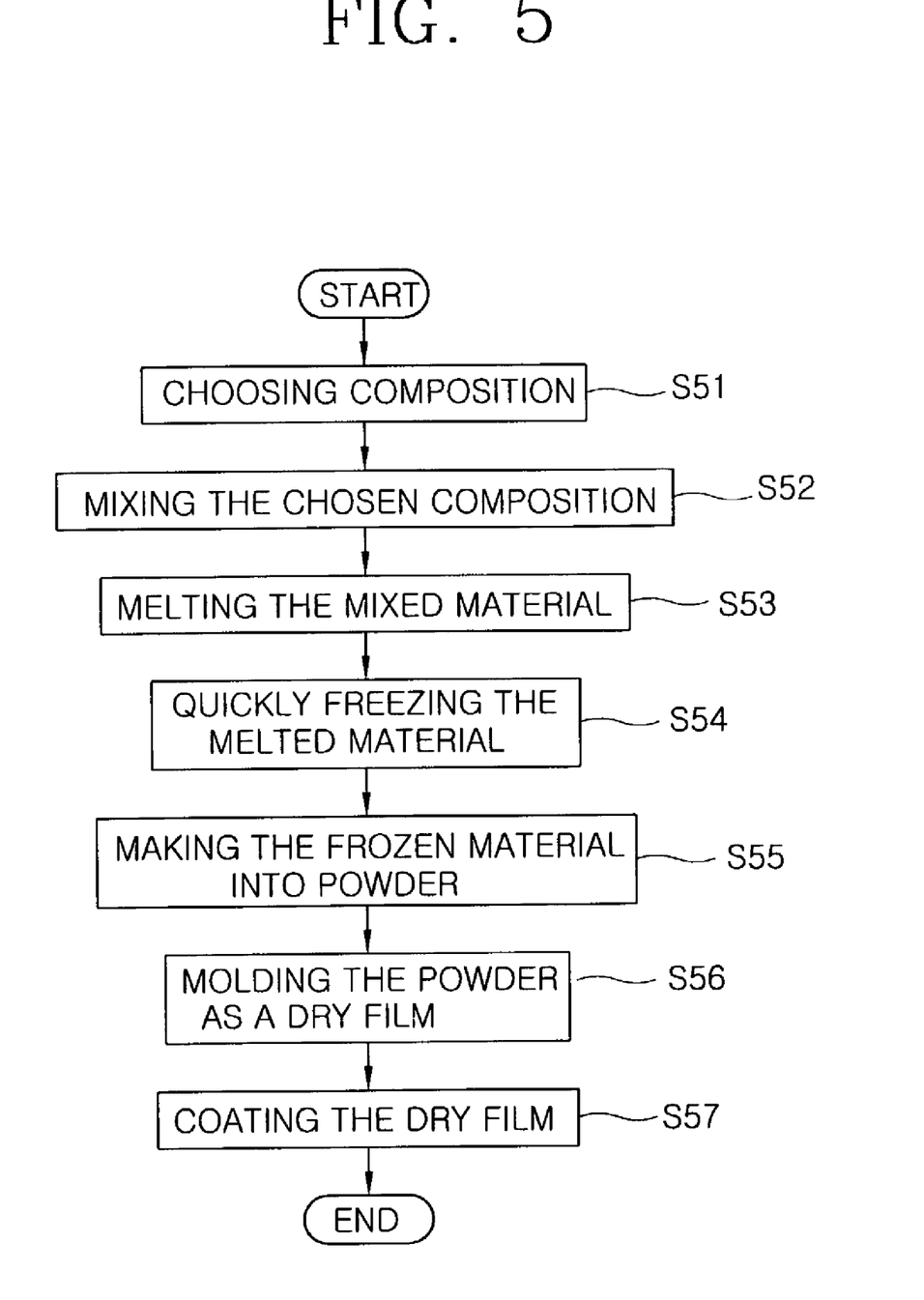
FIG. 5 is a flow chart showing fabricating processes of the dielectric layer using a laminating method.

FIG. 5 is a flow chart showing a method for fabricating the dielectric layer using the laminating method. Hereinafter, the method for fabricating the dielectric layer using the laminating method will be described in detail in order.

1. Materials are made to fine powder through the mixing, melting, quick freezing, and grinding processes as in the paste print method (S51~S55).

2. The fine powder is mixed with an organic solvent, the mixed powder is made as a slurry form having low viscosity, and the powder of slurry form is molded to be a dry film using a casting method (S56).

3. The dry film is coated on the upper glass substrate to form a filter (dielectric layer 100) for filtering the visible light. The passivation layer 6 such as MgO may be formed on the dielectric layer 100 for protecting the dielectric layer 100 (S57).

On the other hand, the filter for controlling the light transmittance for the visible lights of certain wavelengths emitted from the fluorescent layer in the plasma display panel, that is, the upper dielectric layer 100 may be formed on the upper glass substrate 2.

As described above, the plasma display panel according to the present invention increases the transmittance of blue color visible light more than those of the red and green color visible lights relatively through the upper dielectric layer 100 which is able to change the light transmittance for the visible light of certain wavelength, and thereby, the color temperature and the contrast of the plasma display panel can be improved easily.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A plasma display panel (PDP), comprising:
   an upper glass substrate;
   a sustain electrode formed on a portion of the upper glass substrate;
   a bus electrode formed on a portion of the sustain electrode;
   an upper dielectric layer formed conformal to the bus electrode, the sustain electrode, and the upper glass substrate; and
   a passivation layer formed on the upper dielectric layer, wherein the upper dielectric layer of the PDP is a single layer configured to increase a transmittance of visible light having a blue color wavelength to a higher degree than that of visible light having red and green color wavelengths, and wherein a composition of the upper dielectric layer consists essentially of:
     a ceramic composition which consists of 55 weight %-72 weight % of PbO, 1 weight %-21 weight % of SiO$_2$, 4.2 weight %-20 weight % of B$_2$O$_3$, 1 weight %-7 weight % of Al$_2$O$_3$, 0 weight %-0.5 weight % of MgO, 0 weight %-0.5 weight % of CaO, 0 weight %-9 weight % of ZnO; and
     a coloration additive which consists of 0 weight %-3 weight % of CoO, greater than 0 weight %-3 weight % of Co$_3$O$_4$, and greater than 0 weight %-23 weight % of Nd$_2$O$_3$.

2. The plasma display panel of claim 1, further comprising:
   a lower glass substrate;
   a lower insulating layer formed on the lower glass substrate;
   an address electrode formed on a portion of the lower insulating layer;
   a lower dielectric layer formed on the address electrode and the lower insulating layer; and
   a fluorescent layer formed on the lower insulating layer.

3. A plasma display panel (PDP), comprising:
   an upper layer, comprising:
     an upper glass substrate;
     a sustain electrode formed on a portion of the upper glass substrate; and
     a bus electrode formed on a portion of the sustain electrode, the upper layer consisting of only a single dielectric layer, wherein the single dielectric layer is configured to increase a transmittance of visible light having a blue color wavelength to a higher degree than that of the visible light having red and green color wavelengths, wherein the single dielectric layer consists essentially of:
       a dielectric layer which consists of 55 weight %-72 weight % of PbO, 1 weight %-21 weight % of SiO$_2$, 4.2 weight %-20 weight % of B$_2$O$_3$, 1 weight %-7 weight % of Al$_2$O$_3$, 0 weight %-0.5 weight % of MgO, 0 weight %-0.5 weight % of CaO, 0 weight %-9 weight % of ZnO; and
       a filler which consists of 0 weight %-3 weight % of CoO, greater than 0 weight %-3 weight % of Co$_3$O$_4$, and greater than 0 weight %-23 weight % of Nd$_2$O$_3$.

4. The plasma display panel of claim 3, further comprising:
   a lower substrate;
   an insulating layer formed on the lower substrate;
   an address electrode formed on a portion of the insulating layer; and
   a lower dielectric layer formed on the address electrode and the insulating layer.

5. A plasma display panel (PDP), comprising:
   an upper layer, comprising:
     an upper glass substrate;
     a sustain electrode formed on a portion of the upper glass substrate;
     a bus electrode formed on a portion of the sustain electrode;
     a single dielectric layer formed directly on and in contact with the bus electrode, the sustain electrode, and the upper glass substrate, wherein the single dielectric layer is configure to increase a transmittance of visible light having a blue color wavelength to a higher degree than that of visible light having red and green color wavelengths, wherein the single dielectric layer consists essentially of:
       a dielectric layer which consists of 55 weight %-72 weight % of PbO, 1 weight %-21 weight % of SiO$_2$, 4.2 weight %-20 weight % of B$_2$O$_3$, 1 weight %-7 weight % of Al$_2$O$_3$, 0 weight %-0.5 weight % of MgO, 0 weight %-0.5 weight % of CaO, 0 weight %-9 weight % of ZnO; and
       a filler which consists of 0 weight %-3 weight % of CoO, greater than 0 weight %-3 weight % of Co$_3$O$_4$, and greater than 0 weight %-23 weight % of Nd$_2$O$_3$.

6. The plasma display panel of claim 5, further comprising:
   a lower substrate;
   an insulating layer formed on the lower substrate;
   an address electrode formed on a portion of the insulating layer; and
   a lower dielectric layer formed on the address electrode and the insulating layer.

7. A plasma display panel (PDP), comprising:
   an upper glass substrate;
   a sustain electrode formed on a portion of the upper glass substrate;

a bus electrode formed on a portion of the sustain electrode;

an upper dielectric layer formed on the bus electrode, the sustain electrode, and the upper glass substrate, wherein a composition of the upper dielectric layer consists of:
- a dielectric layer which consists of 55 weight %-72 weight % of PbO, 1 weight %-21 weight % of $SiO_2$, 4.2 weight %-20 weight % of $B_2O_3$, 1 weight %-7 weight % of $Al_2O_3$, 0 weight %-0.5 weight % of MgO, 0 weight %-0.5 weight % of CaO, 0 weight %-9 weight % of ZnO; and
- a filler which consists of 0 weight %-3 weight % of CoO, greater than 0 weight %-3 weight % of $Co_3O_4$, and greater than 0 weight %-23 weight % of $Nd_2O_3$; and a passivation layer formed on the upper dielectric layer, wherein the upper dielectric layer of the PDP is a single layer configured to increase a transmittance of visible light having a blue color wavelength to a higher degree than that of visible light having red and green color wavelengths.

8. The plasma display panel of claim 7, further comprising:

a lower glass substrate;

an lower insulating layer formed on the lower glass substrate;

an address electrode formed on a portion of the lower insulating layer;

a lower dielectric layer formed on the address electrode and the lower insulating layer; and a fluorescent layer formed on the lower dielectric layer.

* * * * *

UNITED STATES PATENT AND TRADEMARK OFFICE
CERTIFICATE OF CORRECTION

| | | |
|---|---|---|
| PATENT NO. | : 7,253,559 B2 | Page 1 of 1 |
| APPLICATION NO. | : 10/242757 | |
| DATED | : August 7, 2007 | |
| INVENTOR(S) | : Myeong Soo Chang | |

It is certified that error appears in the above-identified patent and that said Letters Patent is hereby corrected as shown below:

Title Page and Column 1 line 1 should read (54) PLASMA DISPLAY PANEL HAVING DIELECTRIC LAYER WITH SPECIFIC COLOR ADDITIVE Signed and Sealed this Twenty-seventh Day of November, 2007

JON W. DUDAS
*Director of the United States Patent and Trademark Office*